US008655603B2

(12) United States Patent
Hieb et al.

(10) Patent No.: US 8,655,603 B2
(45) Date of Patent: Feb. 18, 2014

(54) METHODS FOR MONITORING AND MANAGING DELIVERY OF SYRUP IN BAG-IN-BOX SYSTEMS

(76) Inventors: Larry E Hieb, Murphy, TX (US); Vishal Dali, Richardson, TX (US)

( * ) Notice: Subject to any disclaimer, the term of this patent is extended or adjusted under 35 U.S.C. 154(b) by 496 days.

(21) Appl. No.: 12/887,844

(22) Filed: Sep. 22, 2010

(65) Prior Publication Data

US 2011/0071772 A1 Mar. 24, 2011

Related U.S. Application Data

(60) Provisional application No. 61/244,804, filed on Sep. 22, 2009.

(51) Int. Cl.
*G01F 1/00* (2006.01)

(52) U.S. Cl.
USPC ................ 702/45; 702/50; 702/100; 702/189

(58) Field of Classification Search
USPC ............. 702/45, 50, 100, 189; 222/135, 630; 141/285, 301; 73/54.12, 61.41, 861.04
See application file for complete search history.

(56) References Cited

U.S. PATENT DOCUMENTS 4,848,381 A * 7/1989 Livingston et al. ......... 134/57 R
8,286,547 B1 * 10/2012 Lassota .......................... 99/283
2008/0198689 A1 * 8/2008 Breithhaupt ............... 366/152.2

* cited by examiner

*Primary Examiner* — Sujoy Kundu
*Assistant Examiner* — Elias Desta
(74) *Attorney, Agent, or Firm* — Mark D. Miller; William K. Nelson

(57) ABSTRACT

The present invention includes systems, methods and apparatus for detecting whether an acceptable mixture of fluid and water has been delivered by a vending machine. Embodiments of the invention utilize one or more second flow meters located downstream of a mix manifold. The additional flow meter allows the controller of the delivery system or vending machine to monitor and compare the volume of water to the volume of the final mix in order to determine whether an appropriate volume of syrup has or has not been mixed in the dispensed beverage.

5 Claims, 3 Drawing Sheets

METHODS FOR MONITORING AND MANAGING DELIVERY OF SYRUP IN BAG-IN-BOX SYSTEMS

This application claims the benefit of U.S. Provisional Application Ser. No. 61/244,804 filed on Sep. 22, 2009 which is incorporated herein by this reference.

BACKGROUND OF THE INVENTION

I. Field of the Invention

The present invention relates to dispensers of the type which provide beverages by delivering a measured quantity of syrup together with one or more other fluids such as water into a container for consumption, and more particularly to improved systems, methods and apparatus for delivering consistent quantities of syrup in dispensing and vending machines using bag-in-box (BIB) syrup packages.

2. Description of the Prior Art

Bag-in-box (BIB) syrup packages are used in a wide variety of different beverage dispensers and vending machines. A typical dispenser delivers a quantity of syrup from the BIB together with a quantity of water and/or other fluid to form a beverage, such as soda. When activated, a typical dispenser will simultaneously deliver both syrup and water to form the beverage. The syrup and water may be delivered for as long as the dispenser is activated, such as a hand-held dispenser used at a wet bar; or for a measured time interval after the dispenser is activated, such as a pre-programmed dispenser at a fast food restaurant. Other commercial applications include vending machines that dispense a pre-determined quantity of syrup and other fluids (typically water) into a single-serving cup or reclosable pouch. Such vending machines may include a plurality of BIB syrup packages, allowing the user to select from a plurality of flavors (syrups) each of which will be delivered in a measured quantity along with a measured quantity of filtered water and/or other fluids into the cup or reclosable pouch. In many existing BIB delivery systems, water volume is measured using a flow meter that is located upstream of a mix manifold, and syrup (concentrate) volume is controlled by peristaltic metering pumps—one for each of flavor selection of the manifold. It is important for such systems to be able to detect when the BIB package is empty. Otherwise, the machine may deliver an inadequate quantity of syrup if the BIB package is running low, or the machine may deliver no syrup at all if the BIB package is empty. In the first scenario, the result may be in a watered-down beverage; and in the second scenario the result may be a water-only (no concentrate/syrup) beverage. Neither of these scenarios is acceptable to a consumer using such a vending machine.

In order to address this problem, some machines have used a count down program in the vending machine's electronic controller to calculate syrup volume/availability based on the number of vends from a given BIB package, multiplied by a predetermined volume of syrup per vend (depending on desired concentration). However, because of variability in the delivery systems used, which in some cases may be based on a vacuum generated by the flow of water through a mixing device, these systems are not always able to determine exactly when the BIB becomes empty. As a result, such systems may potentially deliver drinks to the consumer having lower than desired concentrate levels, or no concentrate at all. To address these undesired possibilities, a safety margin level has been used to shut down a particular syrup BIB when the theoretical syrup level in that BIB reached a point of approximately 20%.

This approach reduces the potential of a consumer receiving a poor quality product, but at the cost of discarding as much as 20% of the syrup concentrate.

Other problems affecting reliable vending of syrup include failure to recognize a kink in the syrup feed line which could prevent proper syrup flow; and failure to recognize whether an empty BIB has been replaced with a full BIB at time of servicing, especially if the status of an empty BIB has been reset to "full." These scenarios could also result in the machine dispensing lower than desired concentrate levels, or no concentrate at all.

To address these situations and attempt to reduce waste of syrup, peristaltic pumps with encoder circuits have been used to meter out the syrup. Use of the encoder data provides the ability to better track the volume of syrup dispensed during each vend, and allows the safety margin to be reduced from 20% to approximately 5%. Unfortunately this system is not without its own share of potential problems. For example, if the operator fails to route the syrup line tubing through the peristaltic pump correctly, the pump will cycle but no syrup will flow and the customer may receive a lower than desired syrup level, or no syrup at all. Also, this system cannot detect kinking of the syrup line that can restrict flow and result in the same problems. Moreover, the addition of encoder circuits to each of multiple peristaltic pump motors adds a significant cost.

In another attempt to address these situations, attempts were made to detect a difference in the electrical current being drawn by the DC motors that drive the pumps when the syrup line is properly routed and filled with syrup as compared to an empty syrup line or a pump without a syrup line altogether. Unfortunately, this approach was unsuccessful because typical current variations from motor to motor were greater than the variations in current associated with the variable scenarios described above (full line, empty line, missing line).

Thus, the need remains for reliable delivery systems to precisely track the status of BIB packages, avoiding unnecessary waste of the contents of the BIB packages, and also detecting failure to deliver correct amounts of syrup from such packages.

SUMMARY OF THE INVENTION

The present invention includes systems, apparatus and methods that utilize a flow meter provided downstream of the mixing area or manifold. This flow meter allows the controller of the delivery system or vending machine to monitor and compare the volume of water to the volume of the final mix in order to determine that an appropriate volume of syrup has, or has not been mixed in the dispensed beverage. The amount of water delivered is provided by a first flow meter; and the desired amount of concentrate/syrup is a predetermined target amount. The downstream flow meter provides the actual combined delivered amount of water and concentrate/syrup. By subtracting the known amount of water alone (provided by the first upstream flow meter) from the known amount of the delivered combination (provided by the second downstream flow meter), the amount of syrup/concentrate delivered can be easily determined. Not only does this allow the controller to identify when a BIB has transitioned to empty (so that the selection can be flagged as "sold out"), it also allows the controller to detect any other failure to deliver the desired quantity of syrup/concentrate which could be caused by such problems as kinked or improperly routed syrup lines, empty BIB containers that are flagged "full", etc.

Another feature and benefit associated with the use of dual flow meters is the ability to establish multiple acceptability, or quality levels (e.g. high, medium or low—based on the percentage of syrup intended to be delivered). These quality levels can be pre-established and made selectable via a configuration menu in the vending machine control program.

It is to be appreciated that the systems, methods and apparatus of the present invention may be used with a wide variety of different fluid and beverage delivery devices, and are not limited to use only with vending machines.

DETAILED DESCRIPTION

Figure 1:
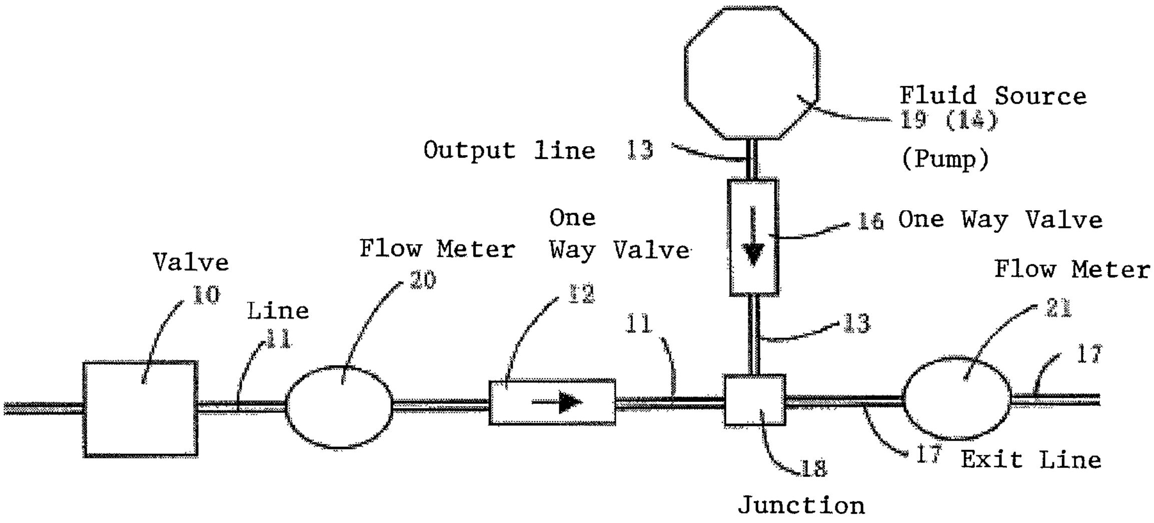
FIG. 1 is a schematic view of an embodiment of a delivery and monitoring system of the present invention.

Referring to the drawings wherein the same reference numeral may be used to designate different parts throughout the several views, and referring particularly to the illustrated exemplary embodiment of FIG. 1, it is seen that this embodiment of the invention includes a conduit line 11 connected to a fluid source. It is to be appreciated that the source fluid (base fluid) used and described in the exemplary illustrated embodiment is water (preferably filtered), but that any other fluid source may be used with the present invention.

In the illustrated embodiment of FIG. 1, a valve 10 is provided on a pressurized water input line. Valve 10 may be solenoid controlled, but in other embodiments, other types of valves or controls may be used to meter source fluid into the system. If a solenoid is used, it may be controlled by a central processor 25 (not shown) which opens and closes the valve to allow controlled amounts of fluid to flow through line 11. In alternative embodiments, a processor-controlled pump may be provided on a non-pressurized water input line to provide controlled amounts of water to line 11. An optional one-way valve 12 may be provided on water line 11 to prevent back flow of fluid.

An output line 13 is provided from a bag-in-box (BIB) or other source 19 of syrup or other concentrated fluid. A peristaltic pump or other appropriate pressure imparting mechanism 14 is provided with BIB 19 and controlled by processor 25 to force fluid from the BIB 19 into line 13. It is to be appreciated that multiple BIBs 19 may be provided, each with its own output line 13 and pump 14, that may be connected to a manifold (not shown) leading to a single output line 15. Since there is only one BIB in the exemplary embodiment of FIG. 1, lines 13 and 15 are the same in this example (both labeled 13). An optional one-way valve 16 may be provided on line 13 or 15 to prevent back flow of fluid from the BIB source(s).

Base fluid (water) input line 11 and syrup line 13 (or 15) are joined together at a junction 18, and line 17 exits from junction 18. A first flow meter 20 is provided on line 11 upstream of junction 18 to measure the amount of fluid (e.g. water) provided through line 11, and a second flow meter 21 is provided downstream of junction 18 on line 17 to measure the total amount of fluid (including mixed syrup) flowing through line 17. In this example, the output from line 17 is dispensed into a reclosable pouch for consumption by the user. It is to be appreciated that in other embodiments, this output may be dispensed into a cup or other container and provided to the user.

Flow meters 20 and 21 are connected to processor 25 and report the flow of fluid on lines 11 and 17. The processor 25 is programmed with an amount of fluid that is expected to be provided from BIB 19 in each dispensing activity. This amount of fluid may be varied, depending on the final concentration desired. Processor 25 also includes programming that is capable of comparing the flow input reported from flow meter 20 (the amount of water initially provided) to that reported from flow meter 21 (the amount of water combined with syrup). Under ideal conditions, the amount of water reported by flow meter 20 added to the expected amount of syrup should be approximately the same as the amount of total fluid reported by flow meter 21, less any tolerances for losses in the lines, etc. If these amounts are not within an acceptable tolerance, then the processor knows that a BIB 19 is not providing the correct output, and may take appropriate action. These actions may include, without limitation, any combination of: changing the BIB to an "empty" or "sold out" status, making this selection unavailable to users, reporting the BIB condition to a central location or processor, capping or closing the BIB, discarding the pouch carrying the unacceptable contents (so that it is not delivered to the user), providing the user with a refund, and/or (if multiple BIBs are available) allowing the user to make another selection.

It is to be appreciated that if the total output reported by flow meter 21 is appreciably less than the sum of the inputs of water and fluid from lines 11 and 13, then the BIB 19 may be empty. A certain amount of variance may be tolerated for water or BIB fluid in lines 11, 13 and 17; this variance may be greater for longer lines. The following calculation shows an exemplary method of implementing a tolerance for fluid left in lines using a "Variance":

$$(\text{Input from flow meter 21}+\text{Variance}-\text{Input from flow meter 20})/\text{Syrup Target}\times 100$$

Processor 25 may then compare the percentage produced by this calculation with a previously defined tolerance (e.g. less than 50% syrup flow) to determine whether or not to shut down BIB 19.

The following example illustrates three exemplary levels of quality/acceptability for a 300 milliliter beverage with a water to syrup ratio of 5 to 1:

Total drink volume: 300 ml

Nominal water volume: 250 ml

Nominal syrup volume: 50 ml

Acceptable syrup volume threshold for high quality drink: 45 ml

Acceptable syrup volume threshold for medium quality drink: 40 ml

Acceptable syrup volume threshold for low quality drink: 35 ml

Theoretically, in the case that the vendor is set to the "medium quality" configuration, the drink mixing system will dispense 250 ml of water as measured by the first flow meter and attempt to dispense 50 ml of syrup via a peristaltic pump 14 that is energized for a predetermine time that has been established to dispense the intended volume of syrup (in this case 50 ml). The second flow meter 21 measures the total volume of the drink (water plus syrup) and compares the result to the acceptability criteria (290 in the case of medium quality setting), and if the measured volume is 290 or above, the drink is declared acceptable and is then delivered to the consumer. If the total measured volume is 289 or lower, the drink is declared unacceptable. It is then discarded and the corresponding selection is flagged as sold out and the customer may be prompted to make another selection.

In practice, there are typically variations from actual flow volumes versus the reported volumes from the flow meters. These variations are more pronounced at the second flow meter 21 due to the drop in internal pressure at the second flow meter relative to the first flow meter 20. Therefore different criteria may be used to account for the lost volume as measured by the flow meters. The table of FIG. 2 shows the relation between the pump, water flow, syrup flow and the difference in the water and syrup (using a random sample).

Figure 2:
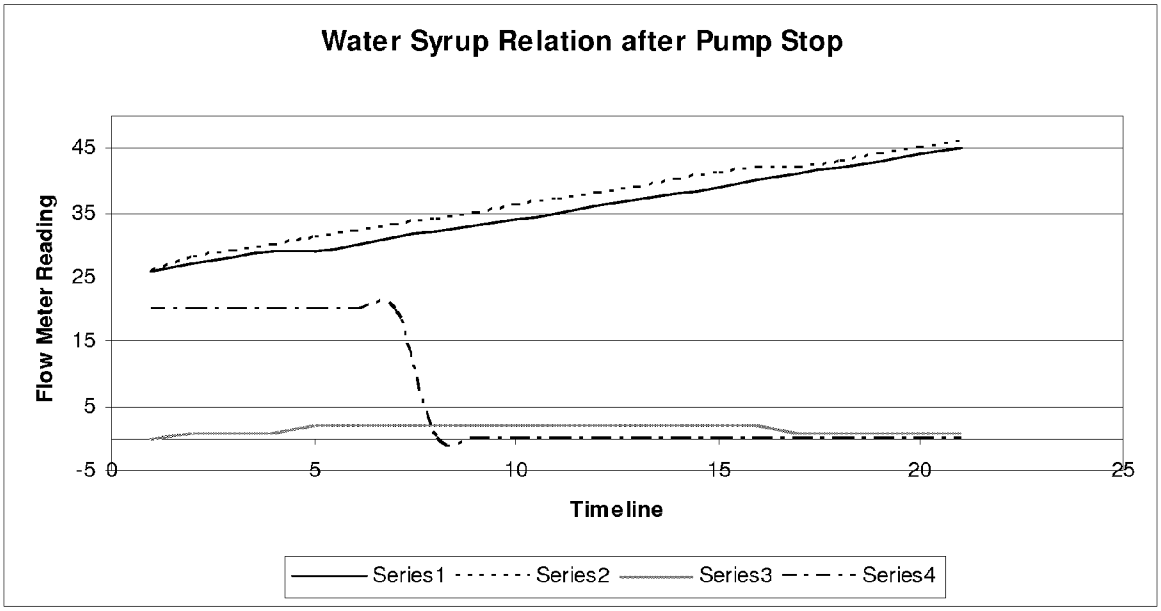
FIG. 2 is a table showing the relation between the pump, water flow, syrup flow and the difference in the water and syrup using a random sample.

In the table of FIG. 2:

Series 1: Water Mains Flowmeter (20)

Series 2: Syrup/Manifold (Total) Flowmeter (21)

Series 3: Total FM-Water FM

Series 4: Peristaltic Pump On/Off

Timeline: 1 period=40 ms 25 period=1 second

Using the information in Table 1 (FIG. 2), in order to determine if the BIB is empty ("soldout"), the following steps are followed:

Monitor the difference (Series 3) for 1 second after the Pump is turned off.

Get the maximum difference during the monitoring period.

Figure 3:
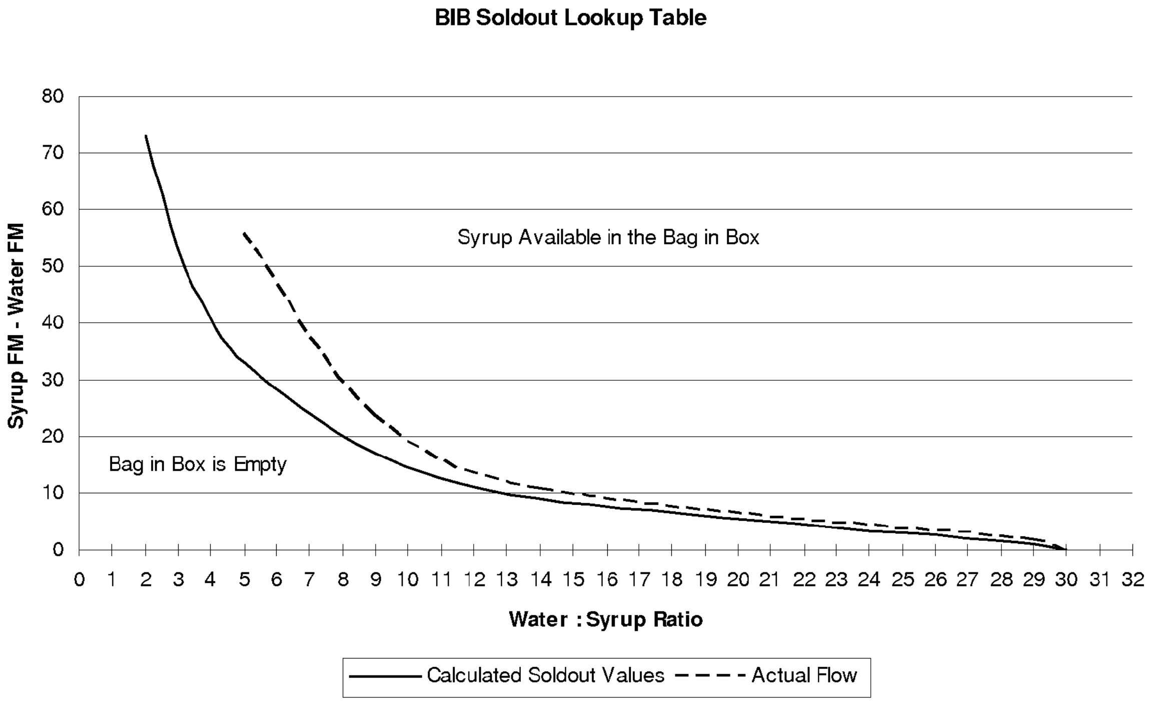
FIG. 3 is a table showing soldout look-up and actual flow of syrup.

Compare the value with a look-up table as defined by the graph of FIG. 3 (Table 2).

If the value is less that the value in the look-up table, then the BIB is empty; proceed to discard the pouch filled with fluid (drop inside the machine); mark BIB as "soldout"; prompt user to make another selection. If the value is greater or equal to the look-up table, then the BIB is full;

proceed to drop the pouch in the bucket for delivery to the customer. The graph below shows less tolerance with higher concentrates.

The systems, methods and apparatus of the present invention allow for the detection of empty/soldout BIBs, or any other condition causing less than a desired amount of BIB fluid (syrup/concentrate) to be delivered. It is to be appreciated that in alternative embodiments, additional flow meters may be provided on each BIB line, and on any other fluid input lines, in order for the processor to track the quantities of fluid flowing therethrough and make appropriate computations regarding the output.

It is to be understood that variations and modifications of the present invention may be made without departing from the scope thereof. It is also to be understood that the present invention is not to be limited by the specific embodiments or combinations of the components or parts disclosed herein, nor by any of the exemplary embodiments or combinations set forth in the attached illustrations.

What is claimed is:

1. A system for monitoring the fluid mixture of beverages delivered into reclosable pouches by a vending machine comprising:

a. a processor in communication with a first flow meter on a first base fluid input conduit;

b. a peristaltic pump in communication with said processor located adjacent to a removable bag of syrup for delivering syrup from said bag through a second fluid input conduit;

c. a junction where said first and second conduits meet for combining base fluid and syrup into a mixture;

d. a second flow meter in communication with said processor located on a third output conduit downstream from said junction; and e. programming in said processor that is capable of receiving measurements from said first and second flow meters and determining whether mixtures of said base fluid and syrup are within a pre-determined tolerance.

2. The system of claim 1 wherein said base fluid is water.

3. The system of claim 1 wherein a one way valve is provided on said first fluid input conduit.

4. The system of claim 1 wherein a one way valve is provided on said second fluid input conduit.

5. The system of claim 3 wherein a one way valve is provided on said second fluid input conduit.

* * * * *